(12) United States Patent  
Nord et al.

(10) Patent No.: US 7,756,359 B1  
(45) Date of Patent: Jul. 13, 2010

(54) USE OF LOCAL OR GLOBAL QUALITY OF MATCH TO ESTIMATE CONE BEAM CT RECONSTRUCTION ARTIFACT CORRECTION WEIGHT IN IMAGE REGISTRATION

(75) Inventors: Janne Nord, Espoo (FI); Hannu Helminen, Zürich (CH)

(73) Assignee: Varian Medical Systems International AG, Zug (CH)

( * ) Notice: Subject to any disclaimer, the term of this patent is extended or adjusted under 35 U.S.C. 154(b) by 953 days.

(21) Appl. No.: 11/542,958

(22) Filed: Oct. 3, 2006

(51) Int. Cl.  
*G06K 9/32* (2006.01)

(52) U.S. Cl. .................. 382/294; 382/278; 382/284; 382/291; 358/540; 358/450

(58) Field of Classification Search ................ 382/209, 382/219, 278, 284, 294  
See application file for complete search history.

(56) References Cited

U.S. PATENT DOCUMENTS

| | | | |
|---|---|---|---|
| 6,137,910 A * | 10/2000 | Shinagawa et al. | 382/195 |
| 6,344,640 B1 * | 2/2002 | Rhoads | 250/201.9 |
| 7,133,083 B2 * | 11/2006 | Jaynes et al. | 348/745 |
| 7,215,801 B2 * | 5/2007 | Bueno et al. | 382/128 |

OTHER PUBLICATIONS

Stefanescu, R. et al., "Grid powered nonlinear image registration with locally adaptive regularization", Medical Image Analysis, Oxford University Press, GB, vol. 8 (2004), pp. 325-342.

Shen, Jian-Kun et al., "Deformable Image Registration", Image Processing, ICIP 2005, IEEE International Conference, Sep. 11-14, 2005, IEEE, vol. 3, pp. 1112-1115, ISBN 978-0-7803-9134-9/05.

Lester, H. et al, "Non-linear registration with the variable viscosity fluid algorithm", Proceedings of the 16th International Conference on Information Processing in Medical Imaging, Lecture Notes in Computer Science, Springer-Verlag, UK, vol. 1613, pp. 238-251, 1999, ISBN:3-540-66167-0.

Wang, H. et al, "Validation of an accelerated 'demons' algorithm for deformable image registration in radiation therapy" Physics in Medicine and Biology, Taylor & Francis LTD. London, GB, vol. 50, No. 12, Jun. 2005, pp. 2887-2905.

Thirion, Jean-Philippe, "Non-Rigid Matching Using Demons", Proceedings of the 1996 Conference on Computer Vision and Pattern Recognition (CVPR '96), San Francisco, Jun. 18-20, 1996, IEEE Computer Society Washington, DC, USA, pp. 245-251, ISBN:0-8186-7258-3.

* cited by examiner

*Primary Examiner*—Yosef Kassa  
(74) *Attorney, Agent, or Firm*—Gard & Kaslow LLP (57) ABSTRACT

Disclosed are systems for and methods of registering a deformable image with a reference image subject to a local or global quality of match. These systems and methods may use the quality of match to reduce effects of artifacts within the deformable image or the reference image on a deformation algorithm. The registration includes modifying the deformable image to match similar features in the reference image. The systems include a deformation engine configured for performing the deformation algorithm subject to the local or global quality of match. The systems and methods allow for correcting for cone beam computed tomography artifacts in one or more of the images.

19 Claims, 4 Drawing Sheets

USE OF LOCAL OR GLOBAL QUALITY OF MATCH TO ESTIMATE CONE BEAM CT RECONSTRUCTION ARTIFACT CORRECTION WEIGHT IN IMAGE REGISTRATION

CROSS-REFERENCE TO RELATED APPLICATIONS

The present application is related to U.S. application Ser. No. 11/542,952 entitled "Spatially Variant Image Deformation" filed on even date herewith and now issued as U.S. Pat. No. 7,646,936. The disclosure of the above patent application is hereby incorporated herein by reference.

BACKGROUND

1. Field of the Invention

The present invention relates generally to the field of image registration and more specifically to the field of image registration configured for medical applications.

2. Related Art

Deformable image registration is a technique for modifying a deformable image in an elastic way to match similar features in a reference image. The technique, in general, involves determining a transformation necessary to register (e.g., to align) two images by matching structures of interest in the deformable image with structures of interest within the reference image. The matching process includes deforming the deformable image to achieve alignment of these structures within the two images. The deformable and reference images may each be images of a patient at different times. The deformable image may be an image of a healthy person and the reference image may be an image of a patient, or vice versa.

For example, the deformable image may include an image of a patient in which a physician has carefully delineated a treatment volume, and the reference image may include an image of the same patient recorded at a later time during treatment. A treatment volume is a spatial volume within a patient to be treated using radiation such as X-rays or particle beams. By deforming the carefully delineated image to align with an image recorded during treatment, movement of the treatment volume within the patient can be readily identified. The unaltered reference image, having a treatment volume identified through the image registration process, can then be used to target the new position of the treatment volume during treatment.

Various deformation algorithms exist in the prior art. One of these deformation algorithms is referred to as the demons algorithm. One advantage of the demons algorithm is the speed at which the steps of the algorithm are performed (e.g., on the order of minutes).

In some situations, the images are taken using different techniques. For example, one image may be generated using computed (axial) tomography (CT) technology and an other image may be generated using Cone Beam CT (CBCT) technology. CBCT images sometimes include low frequency artifacts (e.g., false features) that are the result of the cone beam CT image generation process. One disadvantage of the existing registration techniques is that they do not account for these low frequency artifacts. For example, an artifact can cause misregistration when attempting to match CT and CBCT images using the demons algorithm. There is, therefore, a need for improved systems and methods of registering medical images.

SUMMARY

Various embodiments include systems for and methods of registering (i.e., aligning) a deformable image with a reference image subject to a local and/or global quality of match. This quality of match is a measure of differences between the deformable image and the reference image and may be used to correct for artifacts in either of the images. As such, the systems for and methods of registering images may include both image deformation and artifact correction. Specifically, a reference image may be used for both deforming images and reducing artifacts in a deformable image. Artifact reduction is achieved by changing the intensity of those pixels in the deformable image that match poorly with the reference image.

A deformation algorithm to be applied to the deformable image includes a local and/or global quality of match calculation. This quality of match calculation is typically made on a pixel by pixel basis and optionally includes consideration of the intensity of neighboring pixels. An output of the quality of match calculation is used to determine a correction weight for each pixel. This correction weight is then used to adjust the intensity of pixels in the deformable image such that their intensity is closer to that of the reference image. As the match between the deformable image and the reference images improves during the image registration process, the correction weights become significant for well matched pixels and are less significant for pixels that are not well matched. As such, artifacts, which should not match, have a reduced impact on the registration process.

In the local quality of match calculation, the match between a pixel in the deformable image and a corresponding pixel in the reference image is determined by considering the intensity of each of these pixels and, optionally, their neighboring pixels. For example, in some embodiments, the local quality of match is determined by applying a correlation function to the pixels within a sphere surrounding the pixel for which the quality of match is being calculated. In alternative embodiments, this sphere is replaced by a Gaussian weighting function or other distribution. This approach is advantageous when used with a deformation algorithm. For example, the local quality of match calculation allows for pixels representative of a tumor to be considered as a group.

By including the quality of match calculation and applying the correction weights derived therefrom, the image deformation process may result in improved accuracy of registration relative to the prior art. For example, an artifact is less likely to be improperly matched with a feature of interest.

In various embodiments, the deformation algorithm includes a global quality of match calculation. This calculation considers the difference in intensities between most or all pixels in the deformable and reference images. A correction weight responsive to the result of the global quality of match calculation may be useful when there is a global difference between the intensities of the two images. For example, when the reference image is overall 20% greater in pixel intensity relative to the deformable image, the global quality of match calculation may be used to normalize this difference.

Various embodiments include a deformation engine configured for performing an image registration process including quality of match values. Various embodiments further include a repository for storing images and/or other data associated with the deformation engine, a computing system for storing part or all of the data associated with the deformation algorithm, and an image generation apparatus for generating the deformable and/or reference images.

Various embodiments of the invention include an image registration system comprising, a deformation engine comprising first logic configured for computing a set of quality of match values between a first image and a second image, second logic configured for computing a set of correction weights using the computed set of quality of match values, third logic configured for generating a maximally corrected image using the second image and the first image, fourth logic configured for modifying intensities of pixels within the first image using the set of correction weights and the generated maximally corrected image, to create a modified first image, and fifth logic configured for applying a deformation algorithm to the modified first image to match the modified first image to the second image.

Various embodiments of the invention include method comprising computing a set of quality of match values between a first image and a second image, computing a set of correction weights using the computed set of quality of match values, generating a maximally corrected image using the first image and the second image, modifying the first image using the computed set of correction weights and the generated maximally corrected image to create a modified first image, and applying a deformation algorithm to the second image and the modified first image to match the modified first image to the second image.

DETAILED DESCRIPTION

Various embodiments include systems for and methods of registering (i.e., aligning) a deformable image with a reference image subject to a set of local and/or global quality of match values. The registration is performed by a registration system and includes modifying the deformable image (e.g., an image of a patient at a beginning of the treatment plan) to match similar features in the reference image (e.g., of the same patient during the course of a treatment plan).

The systems include a deformation engine configured for performing a deformation algorithm subject to quality of match values. The deformation algorithm includes calculating correction weights using the quality of match values and generating a modified deformable image by applying the correction weights to the deformable image. As is further described herein, deformation of an image may be performed in multiple iterations. A deformable image may be referred to as a medical deformable image herein, when the deformable image is used for medical and/or anatomical purposes.

Various embodiments include extensions to the demons algorithm of the prior art. The demons algorithm comprises two phases of deforming an image. In a first phase, the deformable image is deformed in a path of least resistance under the influence of a local force. This force is considered local because the movement of each pixel is determined by considering intensities of local pixels in the reference image. In a second phase, the deformable image is deformed using a global transform. This global transform tends to apply a global force to the pixels opposing the local force of the first phase. In order to deform the deformable image to match a reference image, these two phases of the demons algorithm are typically repeated in an iterative process.

An extension to the demons algorithm includes calculation of a set of quality of match values between the deformable image and the reference image. In typical embodiments, a set of correction weights determined using the set of local quality of match values is applied at the conclusion of the first phase of the demons algorithm. These weights are typically applied to the deformable image, although in alternative embodiments, they may be applied to the reference image. During each iteration, the match between the deformable image and the reference image is expected to change, and the quality of match is, thus, also expected to change. Therefore, the calculation of the quality of match, determination of correction weights, and intensity correction optionally occurs once per iteration of the demons algorithm. In some embodiments, this extension of the demons model is used for Correcting CBCT artifacts in the deformable image.

Figure 1:
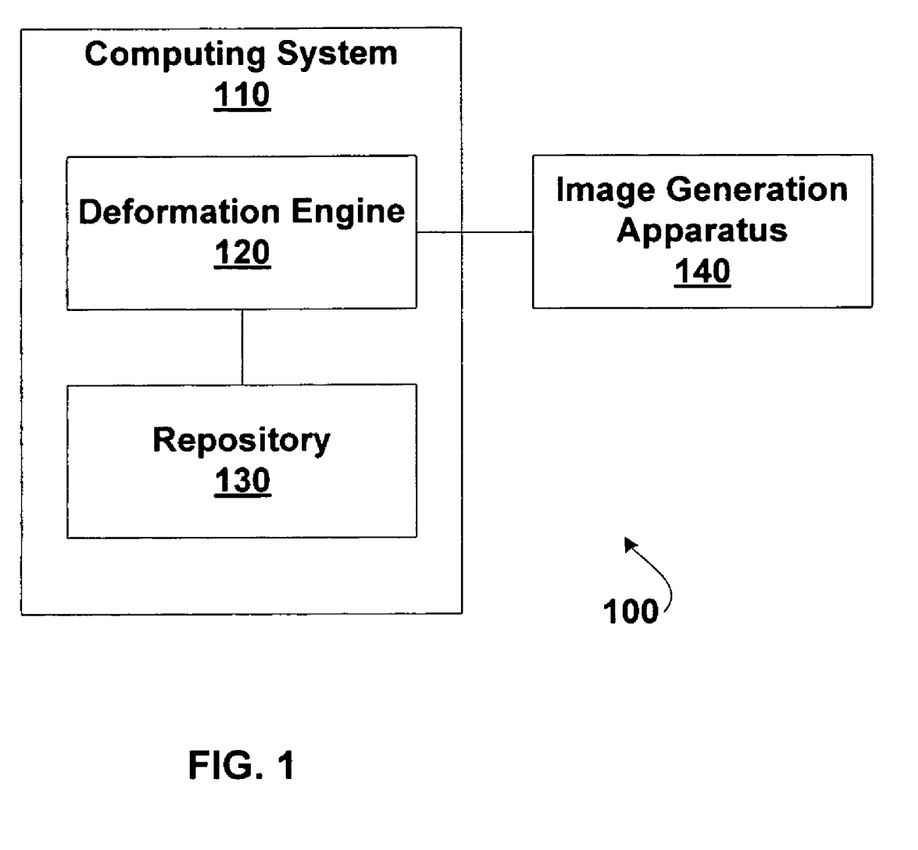
FIG. 1 illustrates various embodiments of an image registration system.

FIG. 1 illustrates an Image Registration System, generally designated 100, according to various embodiments. Image Registration System 100 is configured for deforming a deformable image into alignment with a reference image using a deformation algorithm subject to the set of quality of match values. Image Registration System 100 is optionally further configured for performing computations responsive to the deformed deformable image. For example, some embodiments of Image Registration System 100 include logic configured for automatically determining a volume and/or location of an anatomical structure, such as a tumor, in the reference image. In various embodiments, this logic comprises a processor, hardware, firmware and/or software embodied on a computer readable medium.

Image Registration System 100 typically includes a Computing System 110. Computing System 110 may comprise, for example, a personal computer, workstation, server, computing devices distributed over a network, and/or the like. Computing System 110 includes logic configured for performing computations and/or data processing associated with the deformation algorithm. This logic includes a Deformation Engine 120 discussed further elsewhere herein. In some embodiments, Computing System 110 further includes a Repository 130 configured for storing computing instructions, a reference image, a deformable image, and/or data (e.g., values and/or parameters) associated therewith. Repository 130 may include random access memory, non-volatile memory, volatile memory, magnetic storage, optical storage, and/or the like. For example, in some embodiments, Computing System 110 comprises a hard drive configured for storing data associated with the patient, the reference image, an anatomical structure (e.g., organ) of interest, the deformable image (e.g., a CT or a CBCT image), initial values associated with the deformation algorithm, and/or the like.

Deformation Engine 120 is configured for deforming the deformable image according to a deformation algorithm. Deformation Engine 120 comprises logic configured for performing computations and/or data processing associated with the deforming of the deformable image. This logic may include hardware, firmware and/or computing instructions disposed on a computer readable medium. In some embodiments, Deformation Engine 120 includes a microprocessor and associated memory.

Deformation Engine 120 comprises logic configured for calculating a local and/or global quality of match between the deformable image and the reference image. The quality of match model may include varying degrees of complexity, e.g., comprise a linear model or a non-linear model. For example, in some embodiments the quality of match calculation includes a cross-correlation between a pixel (and its neighbors) in the deformable image and a pixel (and its neighbors) in the reference image. The neighbors included in the cross-correlation calculation may be determined using a sphere, cosine weighted distribution, Gaussian weighted distribution, or the like. In some embodiments, a match calculation is performed for each pixel in the deformation image and corresponding pixel in the reference image.

Deformation Engine 120 further comprises logic configured for computing a correction weight (or set of correction weights) computed using the local and/or global quality of match. This correction weight is used to correct the intensity of a pixel (or set of pixels) in the deformable image. Deformation Engine 120 also comprises logic configured for applying aspects of a deformation algorithm known in the art to the reference image and the deformable image. As is discussed further herein, the deformation algorithm may include aspects of various alternative deformation algorithms known in the art, for example, the demons algorithm. See, for example, "Image matching as a diffusion process: an analogy with Maxwell's demons," by J.-P. Thirion, *Medical Image Analysis*, vol. 2, no. 3, pp. 243-260, 1998.

In some embodiments, part of Deformation Engine 120 is disposed external to Computing System 110. Likewise, in some embodiments, part of Repository 130 is disposed external to Computing System 110.

Image Registration System 100 optionally includes an Image Generation Apparatus 140 configured for generating the reference image and/or the deformable image. Image Generation Apparatus 140 may include, for example, a radiation (e.g., X-ray) source and associated detector configured for detecting X-rays passed through a patient. In various embodiments, Image Generation Apparatus 140 includes a magnetic resonance imaging device, a computed tomography device, a CBCT image generation engine, an ultrasound device, and/or other device known in the art to generate internal images of a patient. Image Generation Apparatus 140 may be configured for generating two-dimensional, three-dimensional, or four-dimensional images. In some embodiments, Image Generation Apparatus 140 may be configured to generate a series of images, for example, a three-dimensional time series of breathing motion. This series is considered a four-dimensional image. Image Generation Apparatus 140 is optionally configured for communicating image data to Computing System 110 through a direct connection (e.g., a cable), over a computing network, or through an alternative communication network.

Figure 2:
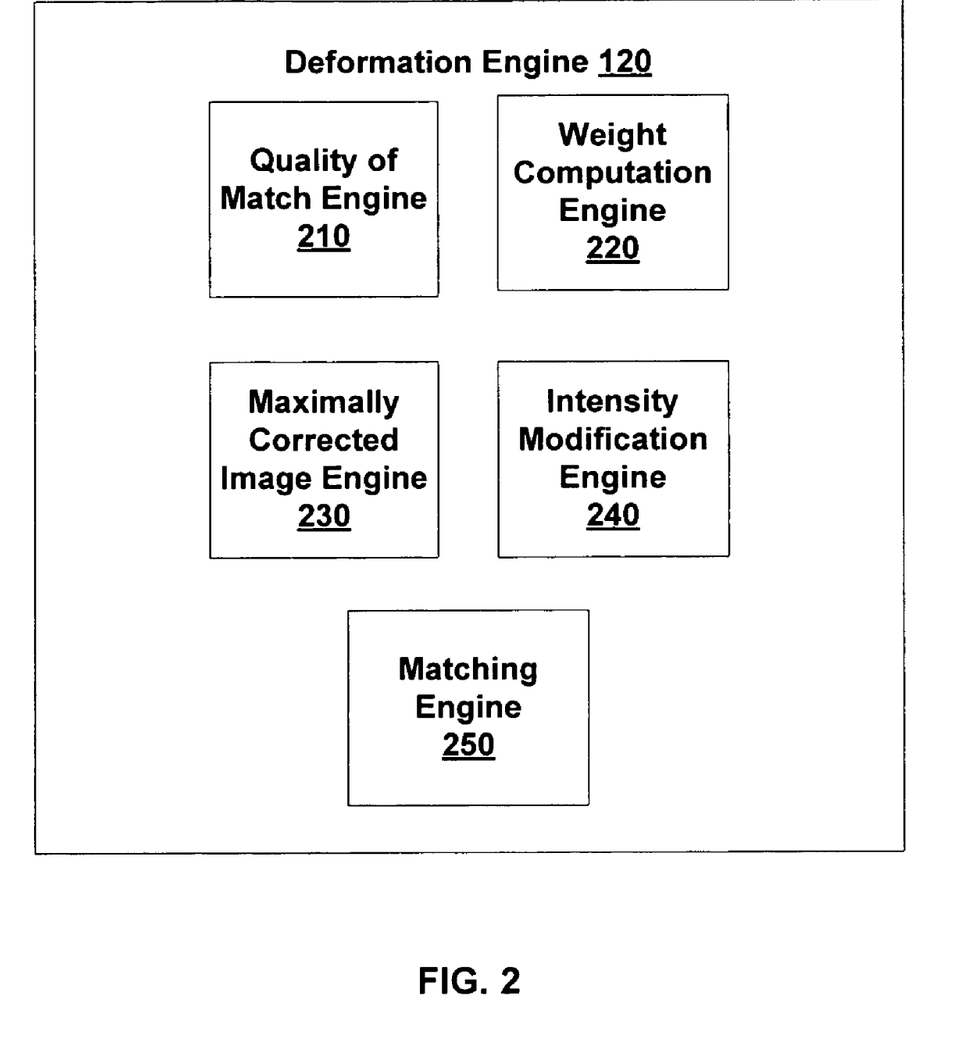
FIG. 2 illustrates various embodiments of a deformation engine.

FIG. 2 illustrates various embodiments of Deformation Engine 120. Deformation Engine 120 comprises a Quality of Match Engine 210, a Weight Computation Engine 220, a Maximally Corrected Image Engine 230, an Intensity Modification Engine 240 and a Matching Engine 250. Each of these elements includes logic embodied in hardware, firmware, and/or computing instructions stored on a computer readable medium.

Quality of Match Engine 210 includes logic configured for computing sets of local and/or global quality of match values for pixels of interest. For example, in one embodiment, Quality of Match Engine 210 includes a processor and associated computing Instructions configured for determining a local quality of match value associated with each pixel of a deformable image. The local quality of match value is representative of an intensity of a pixel, set of pixels, and/or other region in the deformed deformable image relative to an intensity of a corresponding pixel, set of pixels, and/or region in the reference image.

In some embodiments, the local quality of match is used to correct for CBCT artifacts in the deformable image. In some embodiments, a local quality of match is calculated for each corresponding pair or set of pixels and is used to correct for artifacts in CBCT images during the deformation process. This local quality of match is typically represented by a value that is high if the local quality of match is good and low if the local quality of match is poor. If the quality of match is poor, then the image intensity of an associated pixel, set of pixels or image region in one of the images may be considered to be invalid. For example, a pixel in a CBCT image whose intensity is dominated by an image artifact would tend to have poor local quality of match with a corresponding pixel in a CT image. As such, the value representing the quality of match would be low, and it would be assumed that the pixel in the CBCT image is invalid. This process reduces the impact of artifacts on the image restoration process and may even be used to identify artifacts in an image.

In various embodiments, global quality of match values are calculated in a manner similar to that used to calculate the local quality of match values. However, in calculating the global quality of match values most or all of the pixels in the images are compared to generate a single quality of match value. Exemplary mathematical representations of local and global quality of match values are described further herein, for example in connection with FIG. 4.

Weight Computation Engine 220 is configured for computing the set of correction weights using the quality of match values. In some embodiments, the set of correction weights includes values between zero and one in proportion to the quality of match values from which they are derived. For example, the set of correction weights may be derived by normalizing the quality, of match values to a range from zero to one. In other embodiments, the quality of match values are mapped to the set of correction weights using a non-linear function.

The optional Maximally Corrected Image Engine 230 is configured for generating a maximally corrected image from the deformable image and the reference image. In some embodiments, the maximally corrected image is generated by computing a best linear fit between neighborhoods of pixels in the deformable image and the reference image. In various embodiments, the Maximally Corrected Image Engine 230 is configured to compute the maximally corrected image by optimizing the linear fit with respect to a region or set of Pixels rather than an individual pixel. For example, in some embodiments, the maximally corrected image is computed using a linear fit with respect to a neighborhood around a pixel. In some embodiments, the best linear fit may be computed with respect to an individual pixel in addition to, or in lieu of, a set of pixels and/or a region. The Maximally Corrected Image Engine 230 is optional in embodiments in which the reference image is used instead of the maximally corrected image, as further described elsewhere herein.

The Intensity Modification Engine 240 is configured for modifying the intensity of pixels in the deformable image using the set of correction weights calculated using the Weight Computation Engine 220 and the maximally corrected image generated using the Maximally Corrected Image Engine 230. Intensity Modification Engine 240 is configured to apply the set of correction weights to the maximally corrected image to generate a modified deformable image that typically comprises a reduced amount of correction compared to that in the maximally corrected image.

In some embodiments, the Intensity Modification Engine 240 is configured for modifying the intensity of pixels in the reference image. In some embodiments, the Intensity Modification Engine 240 is configured for modifying pixel intensity using the reference image rather than a maximally corrected image. Typically, the correction weights are used to generate a weighted average of each pixel pair (i.e., a pixel from the deformable image and the corresponding pixel from the maximally corrected image) and to replace the pixel in the deformable image with this weighted average. For example, when the correction weight associated with a particular pixel is low, the weighted average is dominated by the pixel from the deformable image, and replacing the pixel in the deformable image with the weighted average will have a relatively reduced effect on the deformable image. When the correction weight is high, the weighted average is dominated by the pixel from the maximally corrected image, and the effect of replacing the pixel in the deformable image will have a relatively greater affect on the deformable image. Typically, higher correction weights are associated with poorer quality of matches between corresponding pixels. However, in alternative embodiments, the reverse could be true if the weights were applied differently by the Intensity Modification Engine 240, as would be apparent to one of ordinary skill in the art. Further details of pixel intensity modification are described elsewhere herein.

In some embodiments, the use of correction weights by the Intensity Modification Engine 240 results in the reduction of CBCT image artifacts. For example, a pixel including an image artifact is expected to have a relatively poor quality of match and, thus, a high correction weight. This high correction weight will result in replacement of the pixel intensity by a maximally corrected pixel intensity that is dominated by a corresponding reference image pixel.

In various embodiments, alternative methods of calculating and applying correction weights can be used. For example, the maximally corrected image may be generated using a non-linear average or the correction weight may be used to modify the intensity of pixels in the deformable image using a non-linear function. Further, in some embodiments, both a local and global quality of match are used by the Intensity Modification Engine 240 to modify the deformable image.

Deformation Engine 240 is configured for applying a deformation algorithm to the deformable image and the maximally corrected image so as to generate a modified instance of the deformable image. Matching Engine 250 is typically configured for performing multiple iterations of the deformation algorithm. In various embodiments, Matching Engine 250 is configured for using different deformation algorithms. For example, in some embodiments, Matching Engine 250 is configured for using a deformation algorithm based on the demons algorithm by Thirion, and/or any extension to the demons algorithm, such as but not limited to the extensions described in U.S. application Ser. No. 11/542,952 entitled "Spatially Variant Image Deformation" and now issued as U.S. Pat. No. 7,646,936.

Matching Engine 250 is configured for performing the deformation algorithm by matching similar features in the reference image and the deformable image, for example, an anatomical feature of interest (e.g., a cortical surface or a lateral ventricle) associated with an organ under treatment. Matching Engine 250 is configured for performing the matching between images in two or more phases. The modification of the deformable image using the Intensity Modification Engine 240 optionally occurs between these phases. For example, the Matching Engine 250 may be configured for applying a first (local) force in a first phase and a second (global) force in a second phase. Some or all of the quality of match calculation using Quality of Match Engine 210, the determination of a set of correction weights using Weight Computation Engine 220, the generation of a maximally corrected image using Maximally Corrected Image Engine 230, and the modification of the deformable image using Intensity Modification Engine 240 may occur between these two phases.

Matching Engine 250 comprises logic configured for performing computations and/or data processing associated with performing the deformation algorithm. For example, in one embodiment, Matching Engine 250 includes a processor and associated computing instructions configured for generating the maximally corrected image and to generate the modified instance of the deformable image by adjusting intensities associated with individual pixels, set of pixels, or other region of the maximally corrected image.

Figure 3:
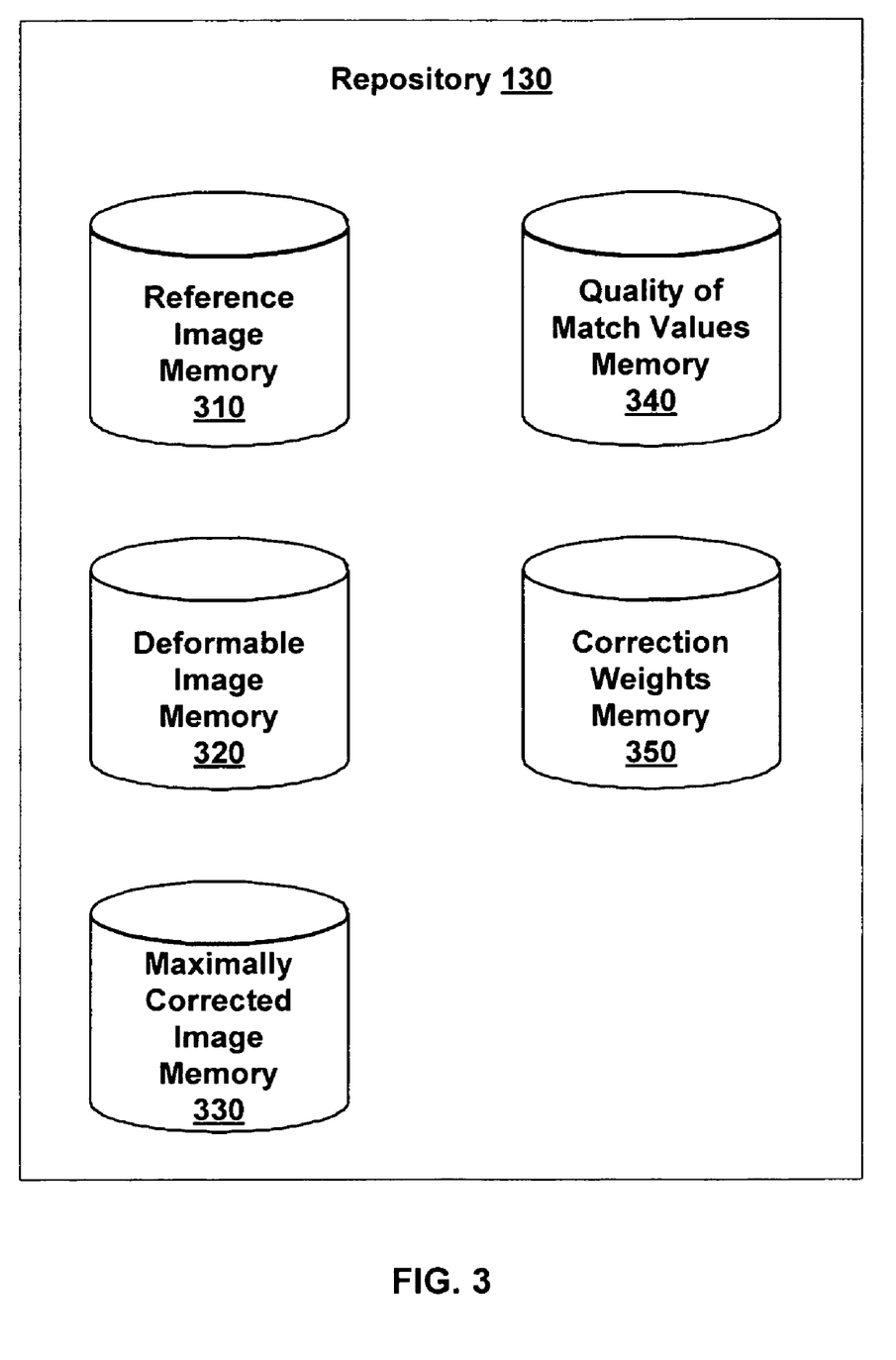
FIG. 3 illustrates various embodiments of a repository.

FIG. 3 illustrates various embodiments of Repository 130. Repository 130 includes data storage configured for storing data associated with Image Registration System 100. Repository 130 may include static memory, volatile memory, magnetic memory, optical memory, and/or the like. For example, in one embodiment Repository 130 includes dynamic read only memory and a hard disk. Repository 130 comprises a Reference Image Memory 310, a Deformable Image Memory 320, a Maximally Corrected Image Memory 330, a Quality of Match Values Memory 340, and/or a Correction Weights Memory 350. These memories are configured for storing a reference image, a deformable image, a Maximally corrected image, a set of quality of match values, and a set of correction weights, respectively. In various embodiments, two or more of these memories share the same computer readable medium. For example, in various embodiments, Reference Image Memory 310 and Deformable Image Memory 320 comprise a single memory.

Reference Image Memory 310 comprises a computer readable medium configured for storing at least one reference image of a patient. For example, Reference Image Memory 310 may be configured for storing a set of images of a brain of a single patient over the course of treatment. A reference image stored in Reference Image Memory 310 is optionally generated using Image Generation Apparatus 140.

Deformable Image Memory 320 comprises a computer readable medium Configured for storing at least one deformable image. This deformable image is optionally generated using Image Generation Apparatus 140. The deformable image may include an image of a patient, an image of a healthy person, an anatomical atlas, and/or a synthetic anatomical image. In some embodiments, Reference Image Memory 310 and Deformable Image Memory 320 share the same device within Computing System 110. For example, Reference Image Memory 310 and Deformable Image Memory 320 may be included on the same hard drive.

Maximally Corrected Image Memory 330 comprises a computer readable medium configured for storing at least one maximally corrected image such as a maximally corrected image generated using Maximally Corrected Image Engine 230. In some embodiments, Maximally Corrected Image Memory 330 and Reference Image Memory 310 and/or Deformable Image Memory 320 share the same device within Computing System 110. For example, Deformable Image Memory 320 and Maximally Corrected Image Memory 330 may be included on the same hard drive.

Quality of Match Values Memory 340 comprises a computer readable medium configured for storing one or more sets of quality of match values computed using Quality of Match Engine 210 and associated with the deformation algorithm. In some embodiments, Quality of Match Values Memory 340 is configured for storing sets of local and/or global quality of match values for individual pixels, sets of pixels, or other regions of one or more deformable images stored in Deformable Image Memory 320.

Correction Weights Memory 350 comprises a computer readable medium configured for storing one or more sets of correction weights computed using Weight Computation Engine 220. In various embodiments, Correction Weights Memory 350 is configured for storing sets of correction weights for pixels in one or more deformable images stored in Deformable Image Memory 320. Exemplary mathematical representations of the correction weights are described elsewhere herein, for example, in connection with FIG. 4.

The term "associated with" as used herein may apply to a parameter, vector, factor, value, and/or the like or its operation. The parameter, etc. is associated with the pixel, set of pixels, or other region of the image if the parameter, etc. is configured for representing a property, value, quality of match and/or characteristic of the pixel, set of pixels, or other region of the image, respectively.

Figure 4:
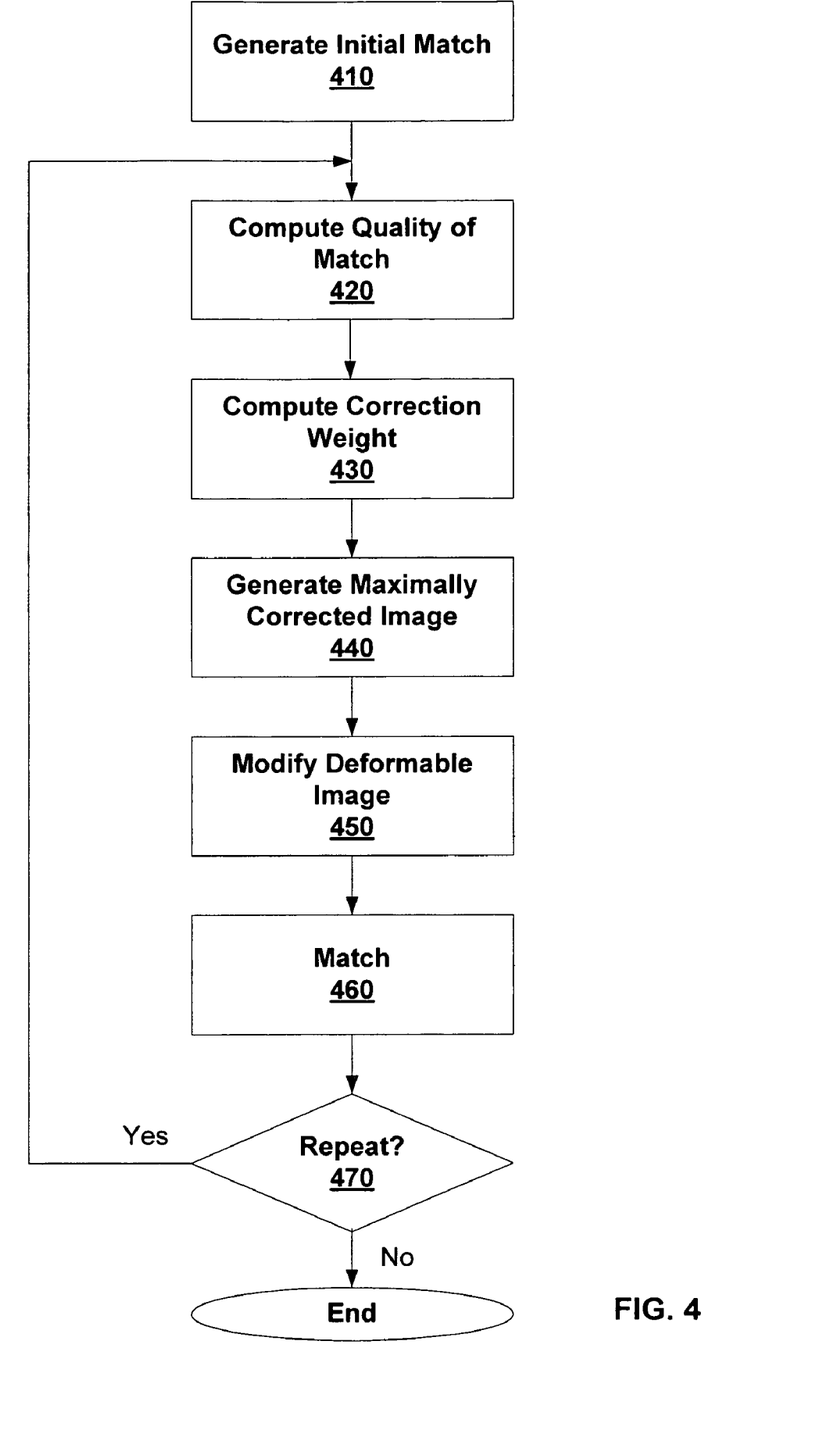
FIG. 4 illustrates methods of deforming a deformable image to match a reference image, according to various embodiments.

FIG. 4 illustrates methods of deforming a deformable image to match a reference image, according to various embodiments. The methods may be performed on all pixels or a set of pixels in the deformable image. For example, the deformation may be performed on a pre-determined set of pixels of interest. The method optionally includes iterative application of the computed correction weights such that the modification of the intensities of pixels in the deformable image occurs progressively toward alignment with the reference image.

In a Generate Initial Match Step 410, an initial match is generated between the reference image and the deformable image. The initial match is typically generated using standard techniques known in the art, for example, using center alignment of the reference image with the deformable image. In some embodiments, the data associated with the initial match is stored in Repository 130. In other embodiments, Generate Initial Match Step 410 comprises inputting part or all of the data associated with the initial match via Computing System 110. For example, the data may be input manually via a user interface or input based on data stored in memory included in Computing System 110.

In a Compute Quality of Match Step 420, Quality of Match Engine 210 is used to compute one or more sets of local quality of match values for each pixel of interest, and/or a global quality of match value. In some embodiments, the local quality of match value is represented mathematically as $Q(x)$, which is the quality of match at a point x (e.g., pixel) in the reference image. The quality of match value for point x can be calculated by considering the match between the deformable and reference images for a set of pixels in a neighborhood around point x. This neighborhood may be represented by a three-dimensional sphere (for a three-dimensional image), a two-dimensional circle (for a two dimensional image), a Gaussian function or some other spatial relation. For example, in various embodiments, the sphere may comprise pixels encompassed within a three-dimensional sphere at least 2, 5 or 10 millimeters in radius. In various embodiments, the volume considered in determining the quality of match may be that represented by at least a specific number of pixels, e.g., at least one, four, or nine pixels.

In some embodiments, the quality of match is computed using a correlation function. A matrix F to represent a mapping between the reference image and the deformable image. $t=Fx$ is the point in the deformable image corresponding to the point x in the reference image. $W^1x(y)=\exp(-(x-y)^2)$ is a correlation weight for the point y in the reference image. This correlation weight optionally has a Gaussian base function. $W^2t(u)=\exp(-(t-u)^2)$ is a correlation weight for the point u in the deformable image. The superscripts 1 and 2 of the correlation weight functions W denote image 1 and image 2, respectively. As used herein, superscript 1 corresponds to the reference image and superscript 2 corresponds to the deformable image.

In some embodiments, the Quality of Match Engine 210 is configured for computing a linear correlation function (e.g., a coefficient and/or line) between set $\{y\}$ and set $\{u\}$ using the weights $W^1x$ and $W^2t$. An output of the linear correlation function represents the quality of match between the points x and t. The mathematical model described above is optionally based on an assumption that variations are linear because the neighborhoods of pixels considered in the calculation are small. In some embodiments, the neighborhoods are of a size such that the assumption of linear variations is invalid. In such embodiments, a different mathematical model may be used, for example, a Gaussian model or a histogram-based variation testing model. A neighborhood comprising most or all pixels in an image may be considered to calculate a global quality of match.

In a Compute Correction Weight Step 430, Weight Computation Engine 220 is used to compute one or more sets of correction weights. In embodiments in which the linear correlation coefficient is used as a quality of match in Compute Quality of Match Step 420, the correction weight function (i.e., mapping function) is represented mathematically as $C(x)$. $C(x)=q(x)$ if $q(x) \geq 0$; $C(x)=0$ if $q(x)<0$. This correction weight function is a smooth function that modifies the deformable image by individual pixel and/or set of pixels. In other embodiments, an alternative correction weight function may be used, for example, a non-linear function. The set of correction weights determines how much of the maximum correction possible in each point is to be applied to the deformable image in order to generate a modified deformable image using the maximally corrected image.

In some embodiments, the correction weights are stored in Correction Weights Memory 350. In other embodiments, part or all of the correction weights are stored external to Computing System 110.

In a Generate Maximally Corrected Image Step 440, Matching Engine 250 is used to compute a maximally corrected image. The maximally corrected image is represented mathematically as $I_{max\_corrected}$. In some embodiments, the intensity of each pixel in the maximally corrected image is computed by using a best linear fit between neighborhoods of pixels in the deformable image and the reference image. In various embodiments, the best linear fit is computed so as to optimize the linear fit with respect to a region or set of pixels rather than an individual pixel. In some embodiments, the best linear fit may be computed with respect to an individual pixel in addition to, or in lieu of, a set of pixels and/or a region. In one exemplary embodiment, the best linear fit between neighborhoods of pixels in a first image (e.g., the reference image) and a second image (e.g., the deformable image) is computed as $I_2=a*I_1+b$. The intensity of the pixel in the maximally corrected image is then computed as $I_{max\_corrected}=a*$(intensity value of $I_1$)$+b$, i.e., as coefficient a multiplied by the intensity value in the first image plus coefficient b. The computed result typically differs from the intensity value of the pixel of the second image, because the fit is optimized to a region larger than the individual pixel for which the computation is performed. The values of coefficients a and b may be available from a quality of match computation.

The computations in Generate Maximally Corrected Image Step 440 are typically based on an assumption that the points of the reference image and the deformable image are well matched. If this assumption is not true, the assumption of using information from both images (in a particular region) in the computation of the maximally corrected image is invalid.

The maximally corrected image is typically stored in Maximally Corrected Image Memory 330. However, in some embodiments, part or all of the data associated with the maximally corrected image is stored in Computing System 110.

In a Modify Deformable Image Step 450, Matching Engine 250 is used to modify the deformable image and, thus, to create a modified deformable image. In some embodiments, the modification to the deformable image is represented mathematically as $I_{modified}(x)=(1.0-C(x))*I_{deformable}+C(X)*I_{max\_corrected}$ where $C(x)$ is the correction weight at pixel x. Typically, the weights $C(x)$ increase as the match gets better. Thus, as the quality of match improves around a pixel x, the intensity of the pixel in $I_{max\_corrected}$ has a greater impact on the intensity of a corresponding pixel in $I_{modified}$. In exemplary embodiments, Modify Deformable Image Step 450 results in the reduction of CBCT image artifacts, provided that the assumption is valid that the match is correct near the particular region in which the deformable image is modified. It will be clear to those of ordinary skill in the art that there are alternative ways of modifying the deformable image using the correction weight that may be used to achieve a similar advantageous result. In some embodiments, a non-linear relationship between $I_{deformable}$, $I_{max\_corrected}$ and $C(x)$ is used in Modify Deformable Image Step 450.

In a Match Step 460, similar features (e.g., anatomical structures) in the reference image and the deformable image are matched using Matching Engine 250. This step optionally includes application of a deformation algorithm such as the demons algorithm or the like. While FIG. 4 illustrates Match Step 460 as occurring after Steps 420 through 450, in some embodiments, part of Match Step 460 is performed prior to Steps 420 through 450 and part of Match Step 460 is performed after Steps 420 through 450. For example, a first phase of the demons algorithm may be performed prior to Steps 420 through 450 and a second phase of the demons algorithm may be performed following Steps 420 through 450. In these embodiments, Quality of Match Engine 210, Weight Computation Engine 220, Maximally Corrected Image Engine 230 and/or Intensity Modification Engine 240 operate on an instance of the deformable image that has been modified by the first phase of the demons algorithm, and the second phase of the demons algorithm operates on an instance of the deformable image that has been modified using the Intensity Modification Engine 240.

In a Repeat Step 470, a determination is made as to whether to repeat the method from Compute Quality of Match Step 420. In some embodiments, the method is repeated until equilibrium is reached between the local quality of match and the global quality of match. At equilibrium, subsequent iterations do not significantly improve the image match. For example, in some embodiments, a determination can be made not to repeat the method when Compute Quality of Match Step 420 results in quality of match values above a predetermined value and/or when Compute Correction Weight Step 430 results in correction weights below a predetermined value. In other embodiments, a determination is made not to repeat the method after a predetermined number of iterations has been completed. The criteria for making the determination in Repeat Step 470 are optionally similar to those used in the demons algorithm of the prior art.

If, in Repeat Step 470, a determination is made not to repeat the method, the user of Image Registration System 100 (e.g., a treating physician) can use the deformed deformable image to identify features within the reference image. This identification is optionally automatic. For example, the completed deformable image may be automatically used to identify the location of a treatment volume or sensitive organs in order to avoid injuring the patient with, for example, radiation beams in the spinal cord.

In alternative embodiments, the roles of the deformable and reference images described herein may be reversed in one or more steps illustrated in FIG. 4.

Several embodiments are specifically illustrated and/or described herein. However, it will be appreciated that modifications and variations are covered by the above teachings and within the scope of the appended claims without departing from the spirit and intended scope thereof. For example, the systems and methods described herein are equally applicable to image registration in applications other than the medical field. Thus, as used herein, terms such as anatomical structure may be read to include structures other than human biological organs. Logic components described herein may include hardware, firmware or software embodied on a computer readable medium. While the examples discussed herein are presented in the context of a pixel-based image system, it will be apparent to one of ordinary skill in the art that some embodiments are readily adapted to model-based image systems such as those described in www.sci.utah.edu/research/warping.html. The systems and methods discussed herein may be applied to two- or three-dimensional images. The systems and methods discussed herein perform equally well if the image denoted reference image is instead denoted deformable image and vice versa.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. An image registration system comprising:
   a deformation engine comprising
      first logic configured for computing a set of quality of match values between a first image and a second image,
      second logic configured for computing a set of correction weights using the computed set of quality of match values,
      third logic configured for generating a maximally corrected image using the second image and the first image,
      fourth logic configured for modifying intensities of pixels within the first image using the set of correction weights and the generated maximally corrected image, to create a modified first image, and
      fifth logic configured for applying a deformation algorithm to the modified first image to match the modified first image to the second image.

2. The image registration system of claim 1, wherein the set of correction weights is configured for reducing the impact of an artifact in the first image on the deformation algorithm.

3. The image registration system of claim 1, wherein the set of quality of match values includes a set of global quality of match values.

4. The image registration system of claim 1, wherein computing the set of quality of match values includes computing a linear correlation function.

5. The image registration system of claim 4, wherein computing the linear correlation function to determine a quality of match for a pixel includes considering a set of pixel intensities within a neighborhood of the pixel.

6. The image registration system of claim 5, wherein the neighborhood is defined using a Gaussian function.

7. The image registration system of claim 1, wherein computing the set of quality of match values includes computing a non-linear correlation function.

8. The image registration system of claim 1, wherein the deformation algorithm includes a demons algorithm.

9. The image registration system of claim 1, wherein one of the first image and second image comprises an image generated using cone beam computed tomography technology, and a second of the first image and second image comprises an image taken using computed tomography technology.

10. The image registration system of claim 1, further comprising a repository configured for storing the first image.

11. The image registration system of claim 1, further comprising an image generation apparatus configured for producing the first image or the second image.

12. The image registration system of claim 1, wherein the first image is a deformable image generated prior to a course of treatment and the second image is a reference image generated during the course of treatment.

13. The image registration system of claim 1, wherein the third logic is further configured for generating the maximally corrected image using a linear fit between neighborhoods of pixels in the first image and the second image.

14. A computer readable medium having embodied thereon software executable by a processor to perform a method comprising:
  computing a set of quality of match values between a first image and a second image;
  computing a set of correction weights using the computed set of quality of match values;
  generating a maximally corrected image using the first image and the second image;
  modifying the first image using the computed set of correction weights and the generated maximally corrected image to create a modified first image; and
  applying a deformation algorithm to the second image and the modified first image to match the modified first image to the second image.

15. The computer readable medium having embodied thereon software executable by a processor to perform the method of claim 14, wherein the computing the set of quality of match values includes computing a set of global quality of match values.

16. The computer readable medium having embodied thereon software executable by a processor to perform the method of claim 14, wherein the computing the set of quality of match values includes computing a linear correlation function.

17. The computer readable medium having embodied thereon software executable by a processor to perform the method of claim 14, wherein the deformation algorithm includes a demons algorithm.

18. The computer readable medium having embodied thereon software executable by a processor to perform the method of claim 14, wherein the first image comprises an image generated using cone beam computed tomography technology, and the second image comprises an image generated using computed tomography technology.

19. The computer readable medium having embodied thereon software executable by a processor to perform the method of claim 14, further comprising repeating the method using the modified first image.

* * * * *